United States Patent
Richards

(10) Patent No.: US 11,258,663 B2
(45) Date of Patent: Feb. 22, 2022

(54) MASTER CARRIER OPERATION FOR MULTI-CARRIER UNLICENSED TECHNOLOGIES

(71) Applicant: Telefonaktiebolaget LM Ericsson (publ), Stockholm (SE)

(72) Inventor: Christopher Richards, Ottawa (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/092,039

(22) PCT Filed: Sep. 6, 2018

(86) PCT No.: PCT/IB2018/056815
§ 371 (c)(1),
(2) Date: Oct. 8, 2018

(87) PCT Pub. No.: WO2020/049341
PCT Pub. Date: Mar. 12, 2020

(65) Prior Publication Data
US 2021/0218626 A1    Jul. 15, 2021

(51) Int. Cl.
*H04L 12/28* (2006.01)
*H04L 41/0813* (2022.01)
(Continued)

(52) U.S. Cl.
CPC ..... *H04L 41/0813* (2013.01); *H04W 72/0453* (2013.01); *H04W 72/1289* (2013.01); *H04W 74/0808* (2013.01)

(58) Field of Classification Search
CPC ..... H04B 1/1027; H04B 15/00; H04L 5/0007; H04L 5/0062; H04W 72/0808;
(Continued)

(56) References Cited

U.S. PATENT DOCUMENTS 10,218,450 B1 * 2/2019 Ramsubbaraj ......... H04B 15/00
2016/0301509 A1 * 10/2016 Narasimha ............ H04L 5/0062
(Continued)

OTHER PUBLICATIONS

3GPP TS 36.213 V14.2.0 (Mar. 2017) 3rd Generation Partnership Project; Technical Specification Group Radio Access Network; Evolved Universal Terrestrial Radio Access (E-UTRA); Physical Layer Procedures (Release 14) consisting of 454 pages.
(Continued)

*Primary Examiner* — John Pezzlo
(74) *Attorney, Agent, or Firm* — Christopher & Weisberg, P.A.

(57) ABSTRACT

A network node, wireless device and various methods are provided. For example, a network node for operating in an unlicensed frequency band is provided. The network node includes processing circuitry configured to: modify at least one function of at least one carrier in a frequency band edge of the unlicensed frequency band where the frequency band edge being located, in a frequency domain, in a non-transmission portion of a spectrum mask that is configured to reduce leakage into an adjacent frequency band, and perform a communication function using the at least one carrier having the modified at least one function.

44 Claims, 9 Drawing Sheets

BEGIN

Modify at least one function of at least one carrier in a frequency band edge of the unlicensed frequency band, the frequency band edge being located, in a frequency domain, in a non-transmission portion of a spectrum mask that is configured to reduce leakage into an adjacent frequency band
S100

Perform a communication function using the at least one carrier having the modified at least one function
S102

END

(51) Int. Cl.
  *H04W 72/04* (2009.01)
  *H04W 72/12* (2009.01)
  *H04W 74/08* (2009.01)
  *H04J 1/16* (2006.01)

(58) Field of Classification Search
  CPC . H04W 16/14; H04W 72/04; H04W 72/0453; H04W 72/082; H04W 74/0816
  USPC .................. 370/252, 329, 386, 430, 445
  See application file for complete search history.

(56) References Cited

U.S. PATENT DOCUMENTS

2017/0289967 A1    5/2017  Yu et al.
2019/0239198 A1*   8/2019  Zhang .................. H04W 72/04

OTHER PUBLICATIONS

3GPP TS 136.213 V13.2.0 (Aug. 2016) 3rd Generation Partnership Project; LTE; Evolved Universal Terrestrial Radio Access (E-UTRA); Physical Layer Procedures (Release 13) consisting of 383 pages.
3GPP TSG-RAN WG4 #74; R4-150222; Feb. 9-13, 2015, Athens, Greece; Agenda Item: 9.4.2; Source Qualcomm Inc.; Title: LAA Coexistence Scenarios; Document for Approval, consisting of 4 pages.
International Search Report and Written Opinion of the International Searching Authority dated May 2, 2019 issued in PCT Application No. PCT/IB2018/056815, consisting of 11 pages.
International Preliminary Report on Patentability dated Aug. 13, 2020 issued in PCT Application No. PCT/IB2018/056815, consisting of 24 pages.

* cited by examiner

MASTER CARRIER OPERATION FOR MULTI-CARRIER UNLICENSED TECHNOLOGIES

CROSS-REFERENCE TO RELATED APPLICATION

This application is a Submission Under 35 U.S.C. § 371 for U.S. National Stage Patent Application of International Application Number: PCT/IB2018/056815, filed Sep. 6, 2018 entitled "MASTER CARRIER OPERATION FOR MULTI-CARRIER UNLICENSED TECHNOLOGIES," the entirety of which is incorporated herein by reference.

TECHNICAL FIELD

Wireless communication and in particular, to modifying the functionality of carriers in a frequency band edge of an unlicensed frequency band.

BACKGROUND

License Assisted Access (LAA) is a technology developed by Third Generation Partnership Project (3GPP, a standardization organization) Release 13 and deployed to augment Long Term Evolution (LTE) transmissions on licensed carriers with transmissions in unlicensed bands at both 3.5 GHz and 5 GHz. Specifically, the frequency ranges 3550 to 3700 MHz and 5150-5925 MHz, or parts thereof, are potentially available for LAA operation. This represents a significant amount of spectrum that can be used by operators to augment their service offerings in licensed bands. LAA may employ a Carrier Sense Multiple Access with Collision Avoidance (CSMA/CA) functionality (i.e., Listen Before Talk (LBT)) to help ensure that no other wireless device is transmitting on the medium such as using Wi-Fi, Multefire or LAA, for example, prior to transmission.

One or more LAA LBT requirements are defined in 3GPP Technical Specification (TS) 36.213. The 3GPP LAA LBT procedures were developed in order to be compliant with global regulatory requirements, including the United States Federal Communications Commission (FCC) and European Telecommunications Standards Institute (ETSI) regulations and to ensure fair channel access with non-3GPP or LTE based technologies, such as IEEE 802.11 Wi-Fi.

3GPP TS 36.213 provides two options for implementing the LBT procedures:

1. Type A, also described in 3GPP TS 36.213 section 15.1.5.1, where all carriers operate independent LBT procedures in order to get access to the radio channel and transmit.

2. Type B, also described in 3GPP TS 36.213 section 15.1.5.2, where a master carrier is selected and operates a full LBT procedure after which all associated slave carriers perform a short LBT procedure before transmitting.

With Type B multi-carrier operation, the correct selection of the ideal master channel has a very significant performance impact of all the LAA cell carriers in operation. For example, a busy master channel will cause the master carrier LBT to fail, thus also preventing the slave carrier(s) from transmitting because the short LBT procedure will also fail or not even be performed. In contrast, a very lightly loaded master channel will increase the probability of the master carrier to succeed with LBT and allow the slave carriers to perform and succeed their (short) LBT procedures.

Further, existing enhanced LAA (3GPP release 14, downlink and uplink) implementations assume that each eLAA UL/DL cell (carrier) will provide downlink (DL), i.e., from the base station to the wireless device, and uplink (UL), i.e., from the wireless device to the network node, capabilities. It is assumed by existing implementations and standards that wireless devices will be allocated resources for DL and UL on the same set of carriers.

However, in many regulatory domains, there are additional transmit power limitations and restrictions for wireless devices due to the device ability to provide the same level of RF filtering as base stations. This restricts the already limited UE transmit powers making causing UL power limited deployments, e.g. deployments where the cell size is reduced due to the power limits of the wireless device, even though the wireless device is able to receive the DL transmissions from the base station with good SINR. An example of such transmit power limitations and restrictions is provided in FIG. 1. In particular, signal spectrum is required to fall within the transmit spectrum mask due to regulatory requirements such that certain frequencies such as between approximate −30 MHz and −10 MHz are only used, in existing systems, as a buffer for leakage power from a signal to diminish while staying under the spectrum mask.

These additional transmit power limits are especially severe in the unlicensed 5 GHz spectrum at the band edges, with addition maximum power reduction (A-MPR) values of 15 dB. That is, the wireless device power may be reduced by as much as an additional 15 dB. This may make some 5 GHz channels unsuitable for wireless device UL transmissions, even if the channel is otherwise a good channel for DL transmissions.

While some existing solutions to overcome these problems attempt to use complex PHY, MAC and/or channel selection techniques, coding, retransmission schemes, scheduling, channel reservation (in the case of IEEE 802.11 Wi-Fi), channel selection schemes and carrier aggregation policies, these solutions are complex and difficult to develop and deploy. As a result, these solutions are often not further developed and deployed.

Further, there are a number of channels within the unlicensed bands that are almost entirely unused due to extremely strict radio frequency (RF) regulatory requirements. For example, in the 5 GHz U-NII band: channel 32 (5150-5170 MHz), channel 68 (5330-5350 MHz), channel 96 (5470-5490 MHz) and channel 144 (5710-5730 MHz) require such strict emissions limits that no commercial devices utilize them.

For example, there are differences in regulatory requirements for different unlicensed channels that can inhibit or reduce the performance of uplink (UL) transmissions in some channels compared to other channels, e.g. Out-of-band (OOB) emissions or adjacent channel leakage-power ratio (ACLR) requirements. These requirements make some channels much more preferential to use for UL than others.

There are many possible methods to determine how to schedule DL traffic on multiple unlicensed cells to a wireless device, but these methods do not attempt to maximize the UL transmit power for individual wireless devices (to improve wireless device UL SINR and thus increase throughput and reduce latency).

Similar issues exist with Multefire (standards based on 3GPP LTE but extended by the Multefire Alliance) and 3GPP Rel-16 NR-Unlicensed (in standards development). and IEEE 802.11 Wi-Fi.

SUMMARY

Some embodiments advantageously provide a method and system for modifying the functionality of carriers in a frequency band edge of an unlicensed frequency band edge.

According to one aspect of the disclosure, a network node for operating in an unlicensed frequency band is provided. The network node includes processing circuitry configured to: modify at least one function of at least one carrier in a frequency band edge of the unlicensed frequency band where the frequency band edge being located, in a frequency domain, in a non-transmission portion of a spectrum mask that is configured to reduce leakage into an adjacent frequency band, and perform a communication function using the at least one carrier having the modified at least one function.

According to one or more embodiments of this aspect, the modifying of at least one function of at least one carrier includes disabling scheduling of control and wireless device data on the at least one carrier. According to one or more embodiments of this aspect, the modifying of at least one function of at least one carrier includes: disabling scheduling of wireless device data on the at least one carrier; and configuring communication of a beacon on the at least one carrier. According to one or more embodiments of this aspect, the modifying at least one function of at least one carrier includes: disabling scheduling of downlink control and wireless device data from the network node to the wireless device; and configuring scheduling of uplink control and wireless device data from the wireless device to the network node.

According to one or more embodiments of this aspect, the modifying at least one function of at least one carrier includes: disabling scheduling of downlink data of a wireless device on the at least one carrier; configuring communication of a downlink beacon to the wireless device on the at least one carrier; and configuring scheduling of uplink control and wireless device data from the wireless device to the network node. According to one or more embodiments of this aspect, the frequency band edge of the unlicensed frequency band includes up to a 20 megahertz band, in the frequency domain, in the non-transmission portion of the spectrum mask.

According to one or more embodiments of this aspect, the at least one carrier having the modified at least one function includes a master carrier for performing at least one listen before talk, LBT, function related to determining whether a transmission is present on the at least one carrier before the at least one carrier is used for performing the communication function. According to one or more embodiments of this aspect, the at least one carrier includes a plurality of slave carriers; and the processing circuitry is further configured to determine whether to perform the at least one LBT function on the plurality of slave carriers based on a result from performing the at least one LBT function on the master carrier.

According to one or more embodiments of this aspect, the performing of the communication function using the at least one carrier having the modified at least one function is performed after the at least one LBT function is performed. According to one or more embodiments of this aspect, the processing circuitry is further configured to: receive an indication from a wireless device indicating that the wireless device is capable of license assisted access, LAA, that augments communications on licensed carriers with communications on unlicensed carriers. According to one or more embodiments of this aspect, the processing circuitry is further configured to: rank a plurality of carriers operating in the frequency band edge of the unlicensed frequency band based on: carrier measurements of the frequency band edge of the unlicensed frequency band; and transmit power restrictions on the frequency band edge of the unlicensed frequency band; and schedule a wireless device on a highest rank carrier of the ranked plurality of carriers, the at least one carrier having the modified at least one function being the highest ranked carrier. According to one or more embodiments of this aspect, an edge portion of the non-transmission portion of the spectrum mask corresponds to an out-of-band emissions (OOBE) regulation of the frequency band edge.

According to another aspect of the disclosure, a method for a network node for operating in an unlicensed frequency band is provided. At least one function of at least one carrier in a frequency band edge of the unlicensed frequency band is modified. The frequency band edge is located, in a frequency domain, in a non-transmission portion of a spectrum mask that is configured to reduce leakage into an adjacent frequency band. A communication function is performed using the at least one carrier having the modified at least one function.

According to one or more embodiments of this aspect, the modifying of at least one function of at least one carrier includes disabling scheduling of control and wireless device data on the at least one carrier. According to one or more embodiments of this aspect, the modifying of at least one function of at least one carrier includes: disabling scheduling of wireless device data on the at least one carrier; and configuring communication of a beacon on the at least one carrier.

According to one or more embodiments of this aspect, the modifying of at least one function of at least one carrier includes: disabling scheduling of downlink control and wireless device data from the network node to the wireless device; and configuring scheduling of uplink control and wireless device data from the wireless device to the network node. According to one or more embodiments of this aspect, the modifying of at least one function of at least one carrier includes: disabling scheduling of downlink data of a wireless device on the at least one carrier; configuring communication of a downlink beacon to the wireless device on the at least one carrier; and configuring scheduling of uplink control and wireless device data from the wireless device to the network node. According to one or more embodiments of this aspect, the frequency band edge of the unlicensed frequency band includes up to a 20 megahertz band, in the frequency domain, in the non-transmission portion of the spectrum mask.

According to one or more embodiments of this aspect, the at least one carrier having the modified at least one function includes a master carrier for performing at least one listen before talk, LBT, function related to determining whether a transmission is present on the at least one carrier before the at least one carrier is used for performing the communication function. According to one or more embodiments of this aspect, the at least one carrier includes a plurality of slave carriers; and a determination is made whether to perform the at least one LBT function on the plurality of slave carriers based on a result from performing the at least one LBT function on the master carrier. According to one or more embodiments of this aspect, the performing of the communication function using the at least one carrier having the modified at least one function is performed after the at least one LBT function is performed.

According to one or more embodiments of this aspect, an indication is received from a wireless device indicating that the wireless device is capable of license assisted access, LAA, that augments communications on licensed carriers with communications on unlicensed carriers. According to one or more embodiments of this aspect, a plurality of carriers operating in the frequency band edge of the unlicensed frequency band are ranked based on: carrier measurements of the frequency band edge of the unlicensed frequency band, and transmit power restrictions on the frequency band edge of the unlicensed frequency band; and a wireless device is scheduled on a highest rank carrier of the ranked plurality of carriers, the at least one carrier having the modified at least one function being the highest ranked carrier. According to one or more embodiments of this aspect, an edge portion of the non-transmission portion of the spectrum mask corresponds to an out-of-band emissions (OOBE) regulation of the frequency band edge.

According to another aspect of the disclosure, a wireless device for operating in an unlicensed frequency band is provided. The wireless device includes processing circuitry configured to: receive an indication that at least one function of at least one carrier in a frequency band edge of the unlicensed frequency band has been modified where the frequency band edge is located, in a frequency domain, in a non-transmission portion of a spectrum mask that is configured to reduce leakage into an adjacent frequency band; and perform a communication function using the at least one carrier having the modified at least one function.

According to one or more embodiments of this aspect, the modifying of at least one function of at least one carrier includes disabling scheduling of control and wireless device data on the at least one carrier. According to one or more embodiments of this aspect, the modifying of at least one function of at least one carrier includes: disabling scheduling of wireless device data on the at least one carrier; and configuring communication of a beacon on the at least one carrier.

According to one or more embodiments of this aspect, the modifying of at least one function of at least one carrier includes: disabling scheduling of downlink control and wireless device data from a network node to the wireless device; and configuring scheduling of uplink control and wireless device data from the wireless device to the network node. According to one or more embodiments of this aspect, the modifying of at least one function of at least one carrier includes: disabling scheduling of downlink data of a wireless device on the at least one carrier; configuring communication of a downlink beacon to the wireless device on the at least one carrier; and configuring scheduling of uplink control and wireless device data from the wireless device to a network node.

According to one or more embodiments of this aspect, the frequency band edge of the unlicensed frequency band includes up to a 20 megahertz band, in the frequency domain, in the non-transmission portion of the spectrum mask. According to one or more embodiments of this aspect, the at least one carrier having the modified at least one function includes a master carrier for performing at least one listen before talk, LBT, function related to determining whether a transmission is present on the at least one carrier before the at least one carrier is used for performing the communication function. According to one or more embodiments of this aspect, the at least one carrier includes a plurality of slave carriers for performing at least one LBT function based on a result from performing the at least one LBT function on the master carrier.

According to one or more embodiments of this aspect, the performing of the communication function using the at least one carrier having the modified at least one function is performed after the at least one LBT function has been performed. According to one or more embodiments of this aspect, the processing circuitry is further configured to: provide an indication indicating that the wireless device is capable of license assisted access, LAA, that augments communications on licensed carriers with communications on unlicensed carriers. According to one or more embodiments of this aspect, the processing circuitry is further configured to receive a scheduling for a highest rank carrier of a plurality of ranked carriers operating in the frequency band edge of the unlicensed frequency band, the plurality of ranked carriers being ranked based on: carrier measurements of the frequency band edge of the unlicensed frequency band; and transmit power restrictions on the frequency band edge of the unlicensed frequency band. According to one or more embodiments of this aspect, an edge portion of the non-transmission portion of the spectrum mask corresponds to an out-of-band emissions (OOBE) regulation of the frequency band edge.

According to another aspect of the disclosure, a method for a wireless device for operating in an unlicensed frequency band is provided. An indication that at least one function of at least one carrier in a frequency band edge of the unlicensed frequency band has been modified is received. The frequency band edge is located, in a frequency domain, in a non-transmission portion of a spectrum mask that is configured to reduce leakage into an adjacent frequency band. A communication function using the at least one carrier having the modified at least one function is performed.

According to one or more embodiments of this aspect, the modifying of at least one function of at least one carrier includes disabling scheduling of control and wireless device data on the at least one carrier. According to one or more embodiments of this aspect, the modifying of at least one function of at least one carrier includes: disabling scheduling of wireless device data on the at least one carrier; and configuring communication of a beacon on the at least one carrier.

According to one or more embodiments of this aspect, the modifying of at least one function of at least one carrier includes: disabling scheduling of downlink control and wireless device data from a network node to the wireless device; and configuring scheduling of uplink control and wireless device data from the wireless device to the network node. According to one or more embodiments of this aspect, the modifying of at least one function of at least one carrier includes: disabling scheduling of downlink data of a wireless device on the at least one carrier; configuring communication of a downlink beacon to the wireless device on the at least one carrier; and configuring scheduling of uplink control and wireless device data from the wireless device to a network node.

According to one or more embodiments of this aspect, the frequency band edge of the unlicensed frequency band includes up to a 20 megahertz band, in the frequency domain, in the non-transmission portion of the spectrum mask. According to one or more embodiments of this aspect, the at least one carrier having the modified at least one function includes a master carrier for performing at least one listen before talk, LBT, function related to determining whether a transmission is present on the at least one carrier before the at least one carrier is used for performing the communication function.

According to one or more embodiments of this aspect, the at least one carrier includes a plurality of slave carriers for performing at least one LBT function based on a result from performing the at least one LBT function on the master carrier. According to one or more embodiments of this aspect, the performing of the communication function using the at least one carrier having the modified at least one function is performed after the at least one LBT function has been performed. According to one or more embodiments of this aspect, an indication indicating that the wireless device is capable of license assisted access, LAA, that augments communications on licensed carriers with communications on unlicensed carriers is provided.

According to one or more embodiments of this aspect, receiving a scheduling for a highest rank carrier of a plurality of ranked carriers operating in the frequency band edge of the unlicensed frequency band is received where the plurality of ranked carriers being ranked based on: carrier measurements of the frequency band edge of the unlicensed frequency band; and transmit power restrictions on the frequency band edge of the unlicensed frequency band. According to one or more embodiments of this aspect, an edge portion of the non-transmission portion of the spectrum mask corresponds to an out-of-band emissions (OOBE) regulation of the frequency band edge.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
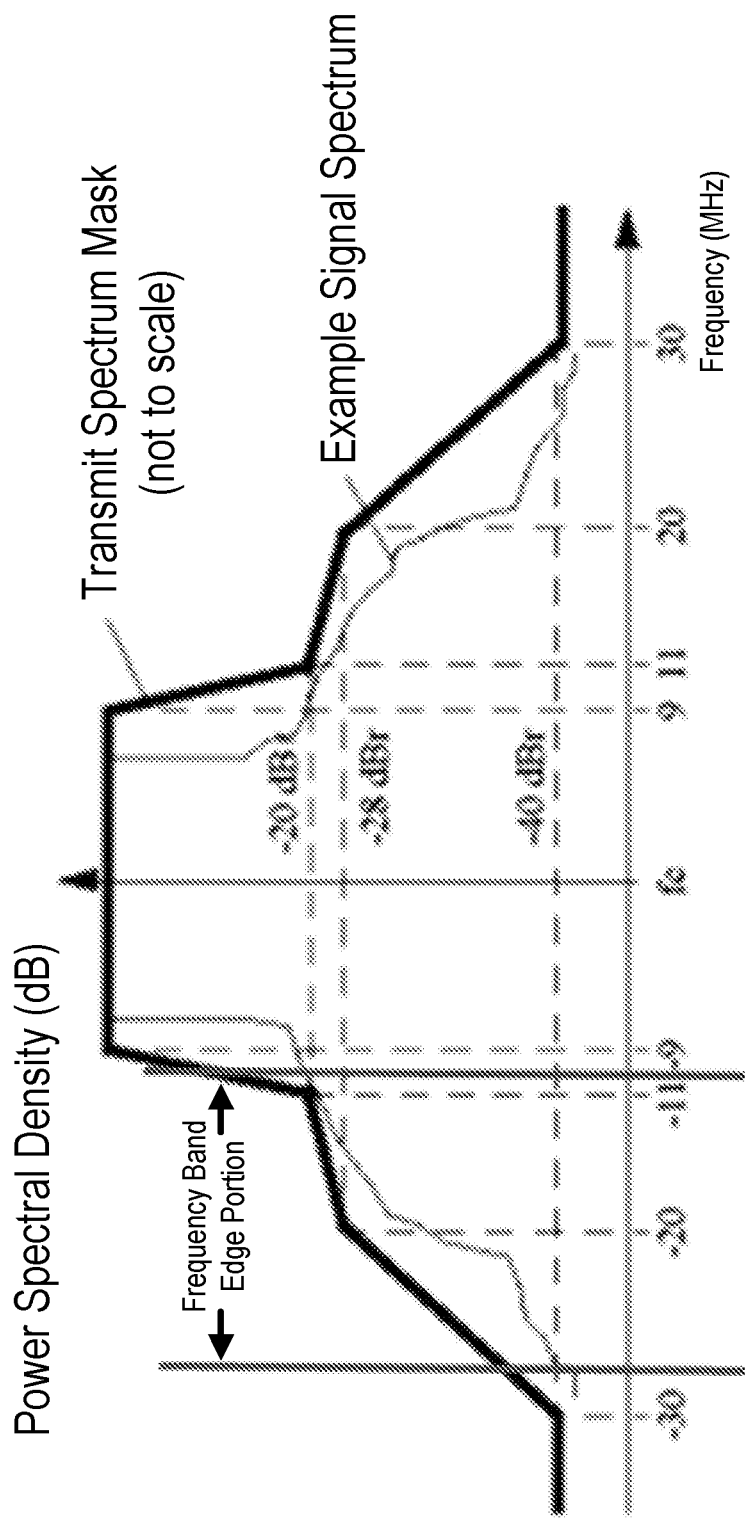
FIG. 1 is a diagram of an example transmit power limitations and restrictions.

A number of channels in the unlicensed band go entirely unused due to the extremely strict RF regulatory requirements, which makes these channels difficult to use for commercial wireless device purposes. The teachings of the instant disclosure advantageously provide mechanisms that operate in this extremely strict RF regulatory environment, thereby providing new functions on resources that would otherwise go unused.

Further, existing multi-carrier LBT mechanisms base the overall LBT success of all the grouped carriers on the success of the LBT procedure of the master carrier. If the master carrier LBT success rate is low, all the slave carriers associated with that master carrier are negatively impacted. This is particularly noticeable as a performance degradation in locations with many unlicensed wireless devices such as airports, stadiums, etc.

The instant disclosure solves at least part of the problems associated with existing systems by providing new functionality for at least one carrier at the frequency band edge of the unlicensed spectrum that would otherwise go unused due to the strict transmission mask that is configured to reduce leakage into an adjacent frequency band. In fact, existing system and/or standards do not even address the use of such carriers in this frequency band edge of the unlicensed spectrum as they assume that these carriers are not usable due to the strict transmission mask. In one or more embodiments, the at least one carrier at the frequency band edge of the unlicensed spectrum is used in the LBT procedure to provide a reliable master carrier. In one or more embodiments, uplink channel selection in the unlicensed band for a wireless device is advantageously performed based on transmit power restrictions while helping maximize one or more uplink metrics such as signal-to-interference plus noise ratio (SINR).

Before describing in detail exemplary embodiments, it is noted that the embodiments reside primarily in combinations of apparatus components and processing steps related to modifying the functionality of carriers in a frequency band edge of an unlicensed frequency band edge. For example, the functionality of carriers may refer to assigned and/or scheduled functionality of carriers, and/or how the carrier is used in the network.

Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible for achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node. In one or more embodiments, the network node is a serving network node of a LAA wireless device or a secondary node. In one or more embodiments, the network node is a primary network node with which the LAA or LTE based wireless device can establish and/or maintain a communication link and/or receive information (e.g., via broadcast channel).

In some embodiments, the non-limiting terms wireless device (WD) or a user equipment (UE) are used interchangeably. The WD (or UE) herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, type of node, V2X wireless device, ProSe wireless device, USB dongles, laptop embedded equipped (LEE), laptop mounted equipment (LME), LAA wireless device, USB dongles, Customer Premises Equipment (CPE), an Internet of Things (IoT) device, or a Narrowband IoT (NB-IOT) device etc.

The term radio access technology, or RAT, may refer to any RAT, e.g., Universal Terrestrial Radio Access (UTRA), Evolved Universal Terrestrial Radio Access (E-UTRA), narrow band internet of things (NB-IoT), WiFi, Bluetooth, next-generation RAT (NR), 4G, 5G, etc. Any of the first and the second nodes may be capable of supporting a single or multiple RATs.

The term signal used herein can be any physical signal or physical channel. Examples of downlink physical signals are reference signal such as Primary Synchronization Signal (PSS), Secondary Synchronization Signal (SSS), Cell Specific Reference Signal (CRS), Positioning Reference Signal (PRS), Channel State Information Reference Signal (CSI-RS), Demodulation Reference Signal (DMRS), Narrowband Reference Signal (NRS), Narrowband Primary Synchronization Signal (NPSS), Narrowband Secondary Synchronization Signal (NSSS), Synchronization Signals (SS), Multimedia Broadcast Single Frequency Reference Signal (MBSFN RS) etc. Examples of uplink physical signals are reference signal such as Sounding Reference Signal (SRS), DMRS, etc. The term physical channel (e.g., in the context of channel reception) used herein is also called as 'channel. The physical channel carries higher layer information (e.g. RRC, logical control channel, etc.). Examples of downlink physical channels are Physical Broadcast Channel (PBCH), Narrowband Physical Broadcast Channel (NPBCH), Physical Downlink Control Channel (PDCCH), Physical Downlink Shared Channel (PDSCH), short Physical Downlink Shared Channel (sPDSCH), Machine Type Communication (MTC) physical downlink control channel (MPDCCH), Narrowband Physical Downlink Control Channel (NPDCCH), Narrow Physical Downlink Shared Channel NPDSCH, Enhanced Physical Downlink Control Channel (E-PDCCH), etc. Examples of uplink physical channels are short Physical Uplink Control Channel (sPUCCH), short Physical Uplink Shared Channel (sPUSCH), Physical Uplink Shared Channel (PUSCH), Physical Uplink Control Channel (PUCCH), Narrowband Physical Uplink Shared Channel (NPUSCH), Physical Random Access Channel (PRACH), Narrowband Physical Random Access Channel (NPRACH), etc.

The term resource used herein may correspond to any type of physical resource or radio resource expressed in terms of length of time and/or frequency. Signals are transmitted or received by a radio node over a time resource. Examples of time resources are: symbol, time slot, subframe, radio frame, Transmission Time Interval (TTI), interleaving time, etc.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

A cell may be generally a communication cell, e.g., of a cellular or mobile communication network, provided by a node. A serving cell may be a cell on or via which a network node (the node providing or associated to the cell, e.g., base station, gNB or eNodeB) transmits and/or may transmit data (which may be data other than broadcast data) to a user equipment, in particular control and/or user or payload data, and/or via or on which a user equipment transmits and/or may transmit data to the node; a serving cell may be a cell for or on which the user equipment is configured and/or to which it is synchronized and/or has performed an access procedure, e.g., a random access procedure, and/or in relation to which it is in a RRC connected or RRC_idle state, e.g., in case the node and/or user equipment and/or network follow the LTE-standard. One or more carriers (e.g., uplink and/or downlink carrier/s and/or a carrier for both uplink and downlink) may be associated to a cell.

Also, in some embodiments, the generic term "radio network node" is used. It can be any kind of a radio network node which may comprise any of network node, base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, LAA, Multefire, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 2:
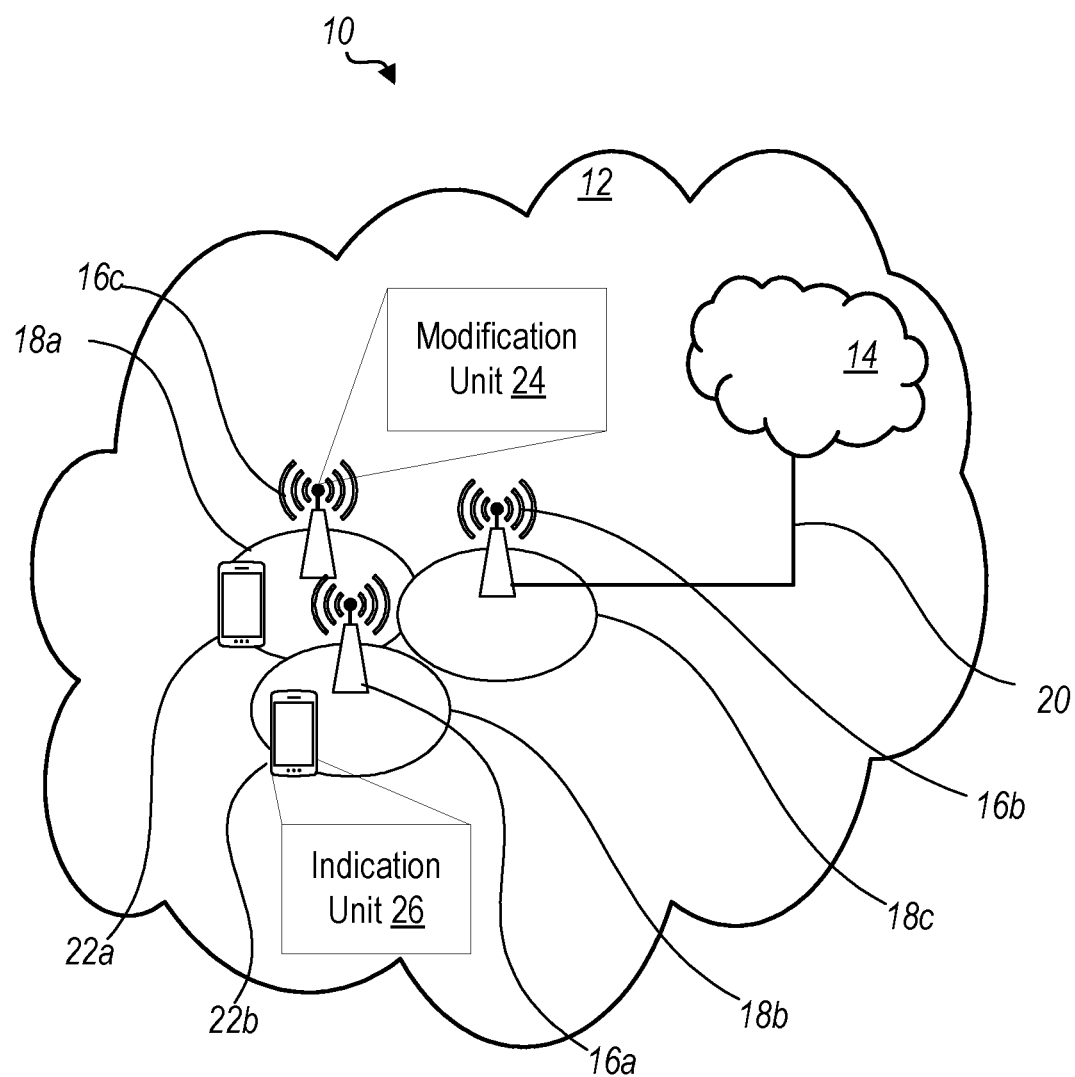
FIG. 2 is a schematic diagram of an exemplary network architecture according to the principles in the present disclosure.

Embodiments here provide for modifying the functionality of carriers in a frequency band edge of an unlicensed frequency band edge. For example, modifying the functionality of at least one carrier may include modifying how the at least one carrier is used in the network such as what type of data can be communicated on the at least one carrier, if any. Returning to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

A network node 16 is configured to include a modification unit 24 which is configured modify at least one function of at least one carrier in a frequency band edge of the unlicensed frequency band, as described herein.

Example implementations, in accordance with an embodiment, of the WD 22 and network node 16 discussed in the preceding paragraphs will now be described with reference to FIG. 3.

The communication system 10 further includes a network node 16 provided in a communication system 10 and comprising hardware 27 enabling it to communicate with the WD 22. The hardware 27 may include a communication interface 28 for setting up and maintaining a wired or wireless connection with an interface of a different communication device of the communication system 10, as well as a radio interface 30 for setting up and maintaining at least a wireless connection 31 with a WD 22 located in a coverage area 18 served by the network node 16. The radio interface 30 may be formed as or may include, for example, one or more RF transmitters, one or more RF receivers, and/or one or more RF transceivers.

In the embodiment shown, the hardware 27 of the network node 16 further includes processing circuitry 32. The processing circuitry 32 may include a processor 34 and a memory 36. In particular, in addition to or instead of a processor, such as a central processing unit, and memory, the processing circuitry 32 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 34 may be configured to access (e.g., write to and/or read from) the memory 36, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 38 stored internally in, for example, memory 36, or stored in external memory (e.g., database, storage array, network storage device, etc.) accessible by the network node 16 via an external connection. The software 38 may be executable by the processing circuitry 32. The processing circuitry 32 may be configured to control any of the methods and/or processes described herein and/or to cause such methods, and/or processes to be performed, e.g., by network node 16. Processor 34 corresponds to one or more processors 34 for performing network node 16 functions described herein. The memory 36 is configured to store data, programmatic software code and/or other information described herein. In some embodiments, the software 38 may include instructions that, when executed by the processor 34 and/or processing circuitry 32, causes the processor 34 and/or processing circuitry 32 to perform the processes described herein with respect to network node 16. For example, processing circuitry 32 of the network node 16 may include modification unit 24 configured to modify at least one function of at least one carrier in a frequency band edge and perform a communication function using the at least one carrier having the modified at least one function, as described herein.

The communication system 10 further includes the WD 22 already referred to. The WD 22 may have hardware 40 that may include a radio interface 42 configured to set up and maintain a wireless connection 31 with a network node 16 serving a coverage area 18 in which the WD 22 is currently located. The radio interface 42 may be formed as or may include, for example, one or more RF transmitters, one or more RF receivers, and/or one or more RF transceivers.

The hardware 40 of the WD 22 further includes processing circuitry 44. The processing circuitry 44 may include a processor 46 and memory 48. In particular, in addition to or instead of a processor, such as a central processing unit, and memory, the processing circuitry 44 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 46 may be configured to access (e.g., write to and/or read from) memory 48, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 50, which is stored in, for example, memory 48 at the WD 22, or stored in external memory (e.g., database, storage array, network storage device, etc.) accessible by the WD 22. The software 50 may be executable by the processing circuitry 44. The software 50 may include a client application 52. The client application 52 may be operable to provide a service to a human or non-human user via the WD 22.

The processing circuitry 44 may be configured to control any of the methods and/or processes described herein and/or to cause such methods, and/or processes to be performed, e.g., by WD 22. The processor 46 corresponds to one or more processors 46 for performing WD 22 functions described herein. The WD 22 includes memory 48 that is configured to store data, programmatic software code and/or other information described herein. In some embodiments, the software 50 and/or the client application 52 may include instructions that, when executed by the processor 46 and/or processing circuitry 44, causes the processor 46 and/or processing circuitry 44 to perform the processes described herein with respect to WD 22.

Figure 3:
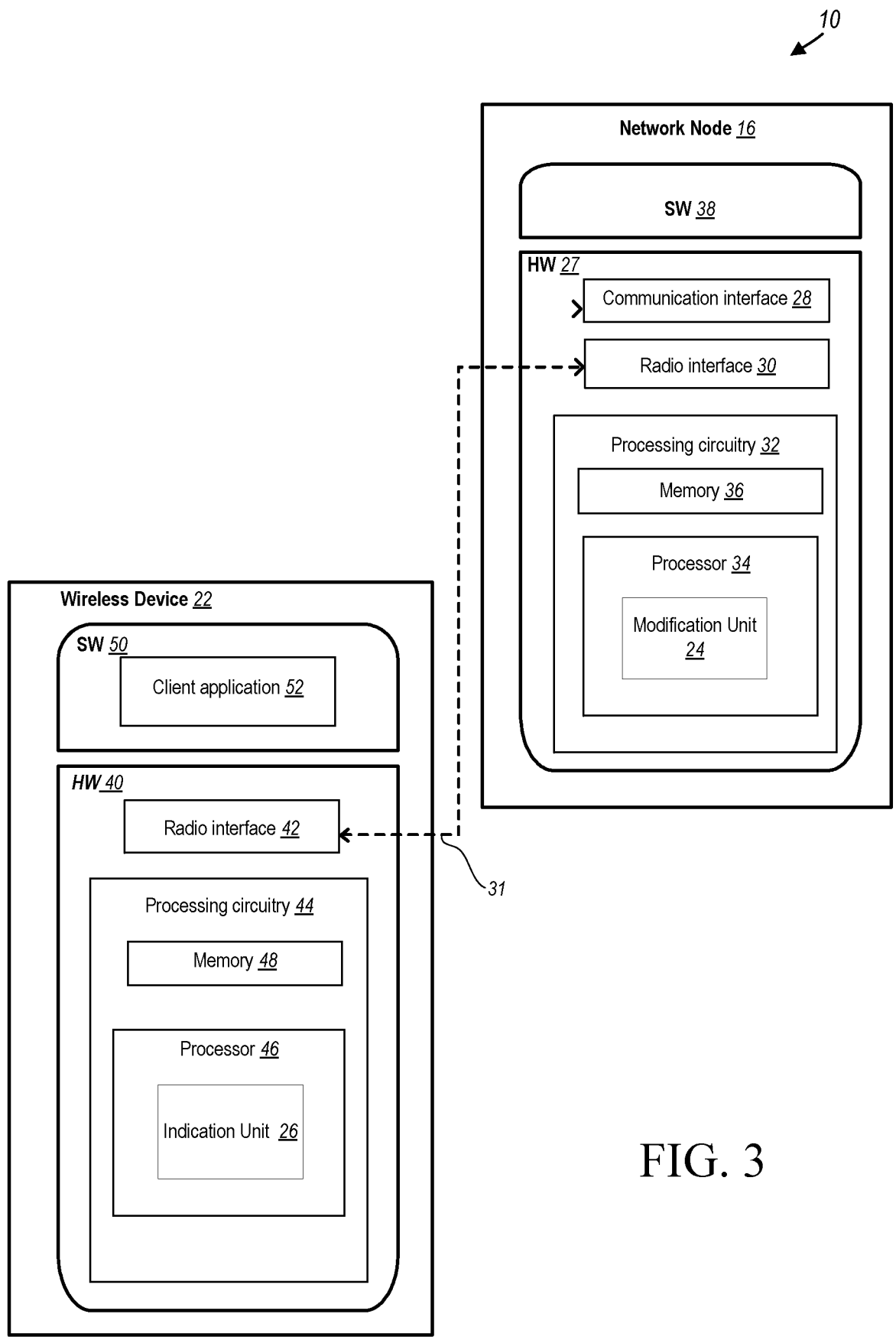
FIG. 3 is a block diagram of a network node communicating with a wireless device over an at least partially wireless connection according to some embodiments of the present disclosure.

In some embodiments, the inner workings of the network node 16 and WD 22 may be as shown in FIG. 3 and independently, the surrounding network topology may be that of FIG. 2. Although FIGS. 2 and 3 show various "units" such as modification unit 24 and indication unit 26 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 4:
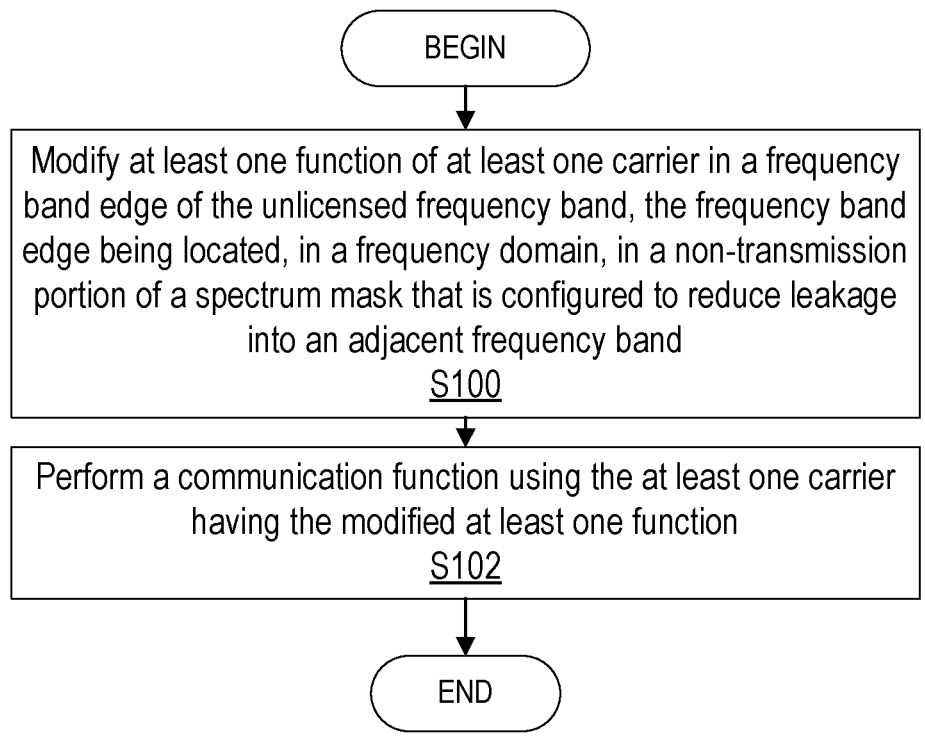
FIG. 4 is a flowchart of an exemplary process for modifying the functionality of carriers in a frequency band edge of an unlicensed frequency band edge for performing a communication function.

FIG. 4 is a flowchart of an exemplary process performed by a network node 16, for example, for modifying the functionality of carriers in a frequency band edge of an unlicensed frequency band edge for performing a communication function, as described herein. Processing circuitry 32 is configured to modify (Block S100) at least one function of at least one carrier in a frequency band edge of the unlicensed frequency band where the frequency band edge is located, in a frequency domain, in a non-transmission portion of a spectrum mask that is configured to reduce leakage into an adjacent frequency band, as described herein. Processing circuitry 32 is configured to perform (Block S102) a communication function using the at least one carrier having the modified at least one function, as described herein.

In one or more embodiments, the modifying of at least one function of at least one carrier includes disabling scheduling of control and wireless device data on the at least one carrier. In one or more embodiments, the modifying of at least one function of at least one carrier includes: disabling scheduling of wireless device data on the at least one carrier; and configuring communication of a beacon on the at least one carrier. In one or more embodiments, the modifying at least one function of at least one carrier includes: disabling scheduling of downlink control and wireless device data from the network node 16 to the wireless device 22, and configuring scheduling of uplink control and wireless device data from the wireless device 22 to the network node 16.

In one or more embodiments, the modifying at least one function of at least one carrier includes: disabling scheduling of downlink data of a wireless device 22 on the at least one carrier; configuring communication of a downlink beacon to the wireless device 22 on the at least one carrier, and configuring scheduling of uplink control and wireless device data from the wireless device 22 to the network node 16. In one or more embodiments, the frequency band edge of the unlicensed frequency band includes up to a 20 megahertz band, in the frequency domain, in the non-transmission portion of the spectrum mask. In one or more embodiments, the at least one carrier having the modified at least one function includes a master carrier for performing at least one listen before talk, LBT, function related to determining whether a transmission is present on the at least one carrier before the at least one carrier is used for performing the communication function.

In one or more embodiments, the at least one carrier includes a plurality of slave carriers where the processing circuitry 32 is further configured to determine whether to perform the at least one LBT function on the plurality of slave carriers based on a result from performing the at least one LBT function on the master carrier. In one or more embodiments, the performing of the communication function using the at least one carrier having the modified at least one function is performed after the at least one LBT function is performed. In one or more embodiments, the processing circuitry 32 is further configured to receive an indication from a wireless device 22 indicating that the wireless device 22 is capable of license assisted access, LAA, that augments communications on licensed carriers with communications on unlicensed carriers.

In one or more embodiments, the processing circuitry 32 is further configured to: rank a plurality of carriers operating in the frequency band edge of the unlicensed frequency band based on: carrier measurements of the frequency band edge of the unlicensed frequency band, and transmit power restrictions on the frequency band edge of the unlicensed frequency band; and schedule a wireless device 22 on a highest rank carrier of the ranked plurality of carriers, the at least one carrier having the modified at least one function being the highest ranked carrier. In one or more embodiments, an edge portion of the non-transmission portion of the spectrum mask corresponds to an out-of-band emissions (OOBE) regulation of the frequency band edge.

Figure 5:
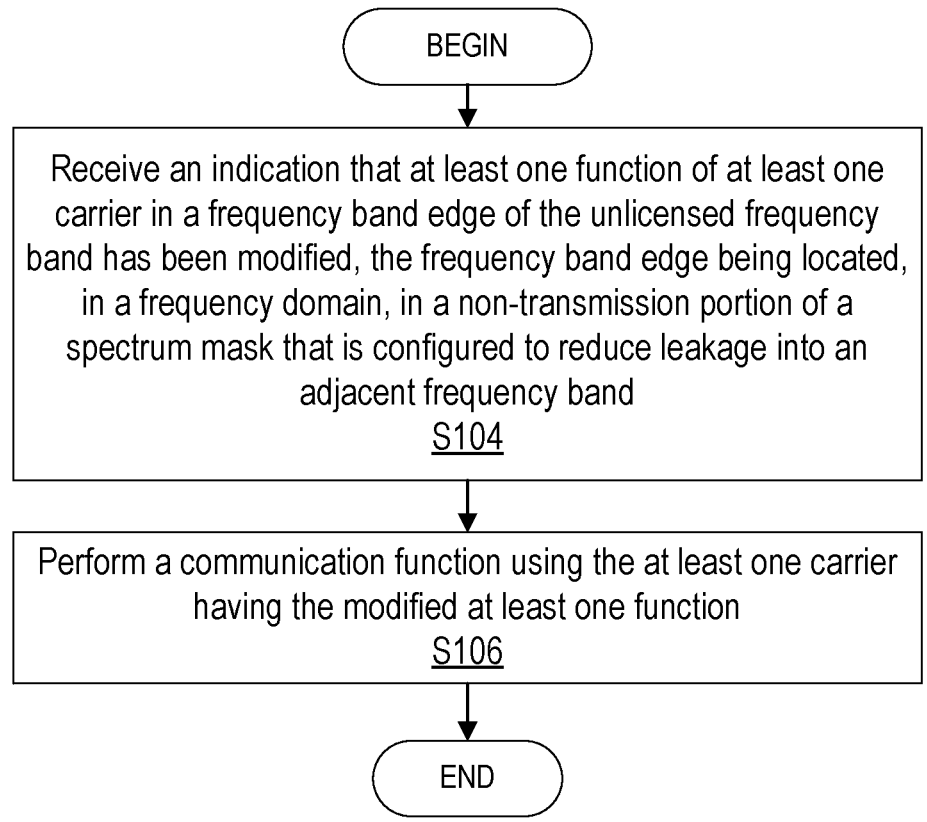
FIG. 5 is a flowchart of an exemplary process for performing a communication function using at least one carrier having modified functionality.

FIG. 5 is a flowchart of an exemplary process performed by wireless device 22, for example, for performing a communication function using at least one carrier having modified functionality, as described herein. Processing circuitry 44 is configured to receive (Block S104) an indication that at least one function of at least one carrier in a frequency band edge of the unlicensed frequency band has been modified where the frequency band edge is located, in a frequency domain, in a non-transmission portion of a spectrum mask that is configured to reduce leakage into an adjacent frequency band. Processing circuitry 44 is configured to perform (Block S106) a communication function using the at least one carrier having the modified at least one function.

In one or more embodiments, the modifying of at least one function of at least one carrier includes disabling scheduling of control and wireless device data on the at least one carrier. In one or more embodiments, the modifying of at least one function of at least one carrier includes: disabling scheduling of wireless device data on the at least one carrier and configuring communication of a beacon on the at least one carrier.

In one or more embodiments, the modifying of at least one function of at least one carrier includes: disabling scheduling of downlink control and wireless device data from a network node 16 to the wireless device 22, and configuring scheduling of uplink control and wireless device data from the wireless device 22 to the network node 16. In one or more embodiments, the modifying of at least one function of at least one carrier includes: disabling scheduling of downlink data of a wireless device 22 on the at least one carrier, configuring communication of a downlink beacon to the wireless device 22 on the at least one carrier, and configuring scheduling of uplink control and wireless device data from the wireless device 22 to a network node 16.

In one or more embodiments, the frequency band edge of the unlicensed frequency band includes up to a 20 megahertz band, in the frequency domain, in the non-transmission portion of the spectrum mask. In one or more embodiments, the at least one carrier having the modified at least one function includes a master carrier for performing at least one listen before talk, LBT, function related to determining whether a transmission is present on the at least one carrier before the at least one carrier is used for performing the communication function. In one or more embodiments, the at least one carrier includes a plurality of slave carriers for performing at least one LBT function based on a result from performing the at least one LBT function on the master carrier.

In one or more embodiments, the performing of the communication function using the at least one carrier having the modified at least one function is performed after the at least one LBT function has been performed. In one or more embodiments, the processing circuitry 32 is further configured to: provide an indication indicating that the wireless device is capable of license assisted access, LAA, that augments communications on licensed carriers with communications on unlicensed carriers. In one or more embodiments, the processing circuitry is further configured to receive a scheduling for a highest rank carrier of a plurality of ranked carriers operating in the frequency band edge of the unlicensed frequency band, the plurality of ranked carriers being ranked based on: carrier measurements of the frequency band edge of the unlicensed frequency band, and transmit power restrictions on the frequency band edge of the unlicensed frequency band. In one or more embodiments, an edge portion of the non-transmission portion of the spectrum mask corresponds to an out-of-band emissions (OOBE) regulation of the frequency band edge.

Having generally described arrangements for modifying at least one carrier in a frequency band edge of the unlicensed frequency band and performing a communication function using the at least one carrier having the modified at least one function, details for these arrangements, functions and processes are provided as follows, and which may be implemented by the network node 16 and wireless device 22, among other entities in system 10.

In one or more embodiments, the probability of successful LBT multi-carrier procedures being performed for LAA or Multefire or NR-U is maximized or increased by modifying the functionality of at least one carrier in the frequency band edge of the unlicensed frequency band as described below. For example, using one or more carriers in the frequency band edge may allow for more successful LBT procedures as these one or more carriers are not in use in existing systems. Therefore transmission is not likely to be detected during LBT procedures.

Modification 1—A Receive-Only Master Carrier in the Frequency Band Edge

Operation of a LAA, Multefire or NR-Unlicensed carrier is enabled where the carrier is configured to provide receive only functionality. In particular, transmit functions for this carrier are disabled such that no control and user data are permitted to be scheduled for transmission on the master carrier in the downlink (DL) and uplink (UL) directions.

Modification 2—A Reduced Power Beacon-Only Master Carrier in the Frequency Band Edge Operation of a LAA, Multefire or NR-Unlicensed carrier is enabled where a power reduced transmit power "beacon", e.g. Discovery Reference Signal (DRS) in 3GPP LAA, NR-Unlicensed or Multefire, is transmitted. No user data is permitted to be scheduled for transmission for the master carrier in DL and UL. In one or more embodiments, the beacon is periodic. Therefore, the master carrier functionality has been modified such that control data or signaling such as the DRS is permitted on the master carrier while no user data is permitted to be transmitted on the master carrier.

Modification 3—Select the receive-only or beacon-only carrier in the frequency band edge, as described above, as the master cell carrier channel and use the master carrier to perform energy (e.g., RSSI) measurements in order to perform LBT. Since the master carrier is in receive-only mode of operation, the possible channel set includes channels at the band edge of the operating band such as, for example, the 5 GHz U-NII band, this includes channel 32 (5150-5170 MHz), channel 68 (5330-5350 MHz), channel 96 (5470-5490 MHz), channel 144 (5710-5730 MHz), where there are few or no existing transmitters operating.

In one or more embodiments, one or more of these modifications may be combined. For example, beacon functionality may be combined with uplink functionality such as by disabling scheduling of downlink data of a wireless device 22 on the at least one carrier, configuring communication of a downlink beacon to the wireless device 22 on the at least one carrier, and configuring scheduling of uplink control and wireless device data from the wireless device 22 to the network node 16, as described herein. In one or more embodiments, the network node 16 does not make any wireless device 22 scheduling grants on the receive only master cell carrier channel.

Some advantages of implementing one or more of these modifications to at least one carrier in the frequency band edge of an unlicensed spectrum include:

1. Improvement of LAA or Multefire or NR-Unlicensed clear channel assessment (CCA) performance when operating in multi-carrier Type B configurations. Slave carriers may only be required to perform a relatively short 25 µs CCA procedure, compared to the much longer CCA procedure required for Type-A scheduling. Since the master cell carrier is operating on a channel frequency that is not used by other technologies or nodes, the overall CCA success probability of the slave cell carriers is significantly increased.

The performance improvement may be more prominent in heavily loaded unlicensed radio channels, such as those seen in airports, stadiums and other densely populated locations.

2. Full compliance with FCC, ETSI and 3GPP Regulations and Requirements.

In one or more embodiments, the modification includes allowing limited transmissions on carriers at the frequency band edge as described below. Using dynamic UL channel selection per wireless device 22 and scheduling the wireless device 22 for uplink transmission on the channel that provides the highest transmit power for the UL transmissions. For example, the wireless device 22 is assigned uplink resources on channels that provide the highest allowable transmit power, thereby helping improve UL SINR. The channels providing the assigned uplink resources may not be the same channels that are transmitting the DL traffic to the wireless device 22. The dynamic UL channel selection may include:

1. Ranking each wireless device 22 UL channel by SINR and transmit power restrictions. In one or more embodiments, this ranking may be updated every time channel measurements are taken by the wireless device 22 or measured by the network node 16 based on channel sounding. Other factors may include LBT success statistics determined by the wireless device 22 or the network node 16 (based on missed UL transmissions from the wireless device 22).

2. Schedule wireless device 22 UL resources on the highest ranked UL channel for that wireless device 22.

In one or more embodiments, if the traffic from the all wireless devices 22 scheduled for that carrier providing a cell exceeds the capacity of the carrier, the next ranked carrier/cell is scheduled for wireless device 22 transmissions. When multiple wireless devices 22 are scheduled for the same cell transmission burst, multi-wireless device scheduling is used. In one or more embodiments, for wireless device 22 random access procedures, the network node 16 indicates the A-MPR value of the cell in the DRS transmitted on that cell DL. Wireless devices 22 can then select the most appropriate cell on which to perform UL channel access and attach procedures. A number of factors that can be taken individually or combined can be used to determine the most appropriate cell on what channel frequency to use. The factors can include but are not limited to: (a) channel load or occupancy, where load/occupancy is defined as energy on the channel sensed by the receiver, e.g., the WD 22, above an energy threshold, e.g., −62 dBm, and/or (b) average channel noise figure of the channel computed by the receiver, e.g., the WD 22, based on an averaging a number of energy level measurements of the channel, the number of transmitting nodes, e.g., WDs 22, sensed on the channel (during a predetermined time window).

This modification of the functionality of at least one carrier in the frequency band edge of an unlicensed spectrum advantageously helps:

ensures that the traffic for each wireless device 22 can be delivered at the highest possible encoding rate for the wireless device 22—improving BLER/reducing re-transmissions and improving throughput for the wireless device 22. For example, the "highest possible encoding rate" can be obtained by having the transmitting WD 22 determine the encoding rate to use based on the channel quality, e.g. SINR of the channel as reported by the receiver. The higher the SINR (less interference and noise) then more aggressive encoding rates can be used. As the encoding rate increases, the receiver requires better SINR (less interference and noise) for successful decoding of the transmission. Higher encoding rates mean more data can be sent in a unit of frequency and time (e.g. OFDM symbol). Picking a better channel with higher SINR allows the use of higher encoding rates and therefore higher data bit rates. There are a number of indicators of channel quality that may be used, including but not limited to: (a) direct: measurements by the receiver that are reported to the transmitter and/or (b) indirect: monitoring the rate of unsuccessful transmissions—which indicates that the receiver could not decode the transmissions improves spectral efficiency for the cell (higher b/s/Hz). Reducing cell load of unlicensed cells allows more traffic to be scheduled for all wireless devices 22.

a wireless device 22 avoid cells with poor channel conditions—and potentially makes more capacity available to other wireless devices 22 (with better channel conditions for that cell).

Figure 6:
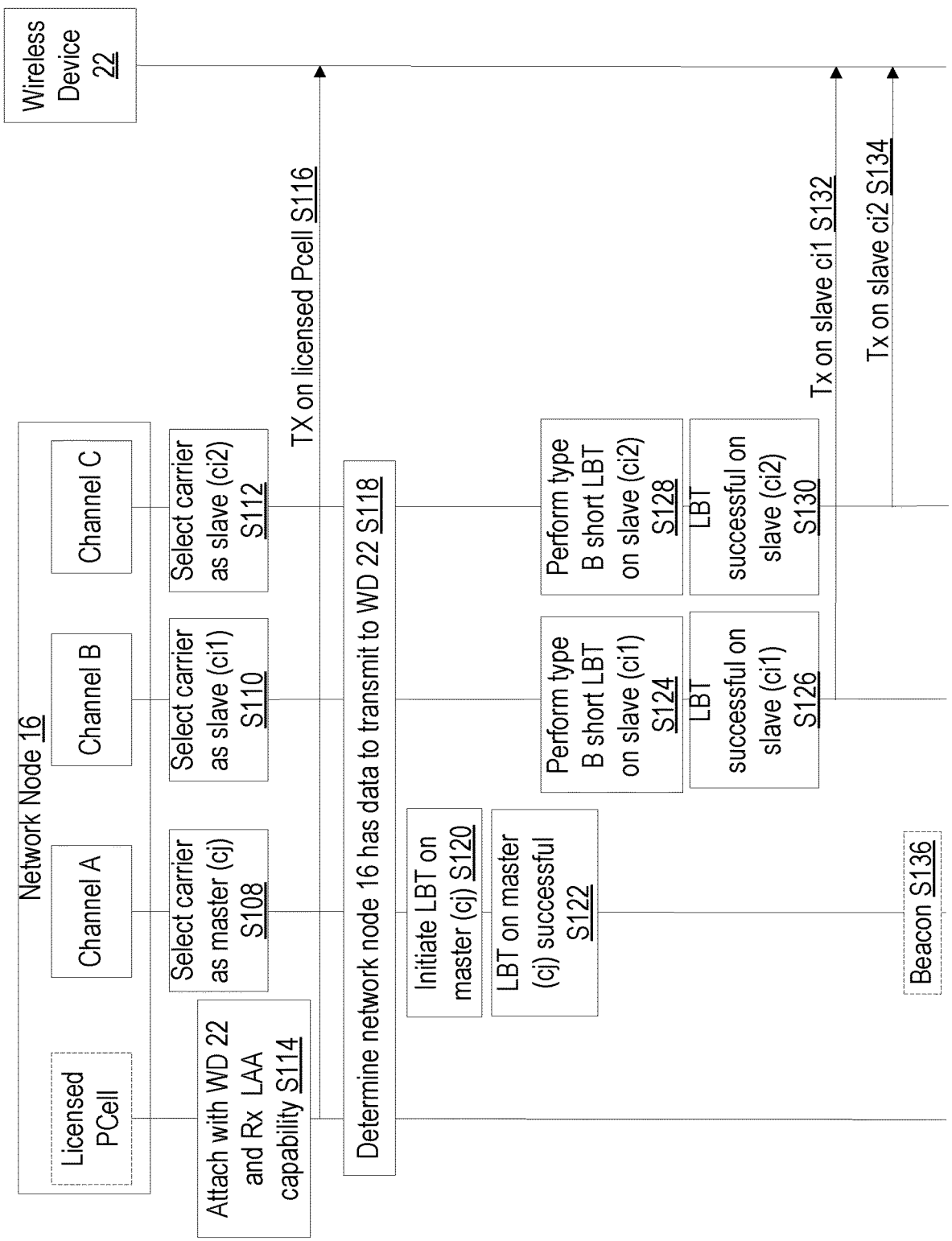
FIG. 6 is a signalling diagram of a receive-only carrier modification in accordance with one or more embodiments of the disclosure.

FIG. 6 is a signalling diagram of an example receive-only carrier modification for at least one carrier in the frequency band edge in accordance with one or more embodiments of the disclosure. In particular, in one or more embodiments, the SCell operating using a master carrier, i.e., master (cj), is not configured or activated for downlink communications to wireless device 22. For technologies that do not require a licensed PCell such as Multefire and NR-Unlicensed, the licensed PCell may be omitted, in which case, one of the transmitting carriers (ci1 or ci2) is used to transmit instead.

Network node 16 selects a carrier corresponding to channel A as master (cj), i.e., master carrier (cj) (Block S108), selects a carrier corresponding to channel B as slave (ci1), i.e., slave carrier (ci1) (Block S110), select a carrier corresponding to channel C as slave (ci2), i.e., slave carrier (ci2) (Block S112). Network node 16 attaches with WD 22 and receives LAA capability of WD 22 (Block S114). In one or more embodiments, WD 22 is configured and activated for LAA SCell carriers ci1 and ci2. Network node 16 transmits on licensed PCell to WD 22 (Block S116). Network node 16 determines it has data to transmit to WD 22 (Block S118). Network node 16 initiates LBT on master (cj) (Block S120). Network node 16 determines LBT on master (cj) is successful (Block S122). Network node 16 performs type B short LBT on slave (ci1) (Block S124). Network node determines LBT on slave (ci1) is successful (Block S126).

Network node 16 performs type B short LBT on slave (ci2) (Block S128). Network node determines LBT on slave (ci2) is successful (Block S130). No wireless device 22 data is transmitted on the SCells, i.e., on slaves ci1 and ci2. Network node 16 transmits on slave (ci1), i.e., transmits on LAA SCell that uses ci1 (Block S132). Network node 16 transmits on slave (ci2), i.e., transmits on LAA SCell that uses ci2 (Block S134). Network node 16 may optionally transmit a beacon as described with respect to FIG. 8 (Block S136).

Figure 7:
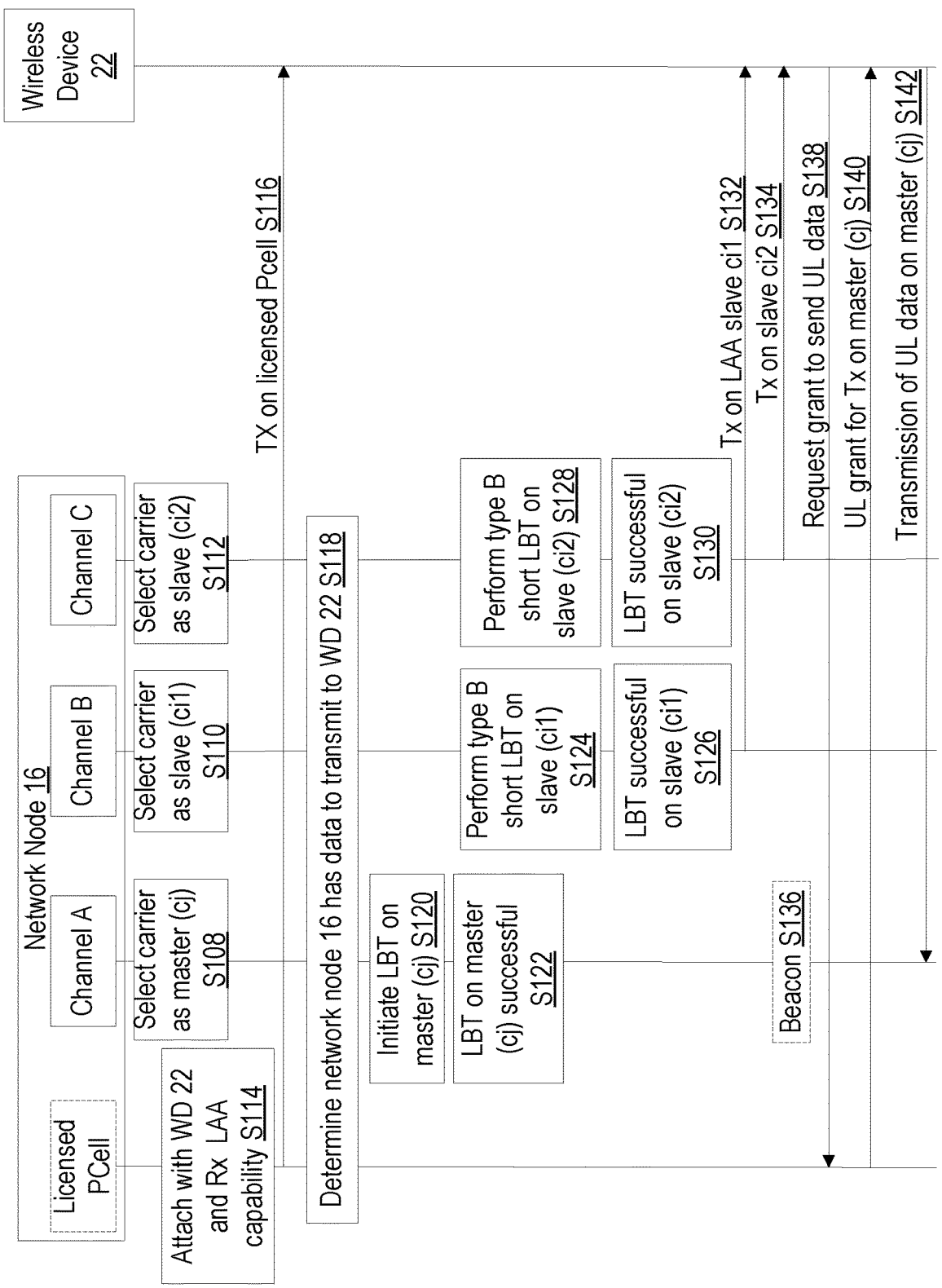
FIG. 7 is a signaling flow chart of a receive-only carrier (cj) and wireless device uplink transmission modification in accordance with the principles of the disclosure.

FIG. 7 is a signaling flow chart of an example receive-only carrier (cj) and wireless device 22 uplink transmission modification in accordance with the principles of the disclosure. Blocks S108 to S136 are described above with respect to FIG. 8 except that the WD 22 is configured and activated for carriers cj, ci1 and ci2. Network node 16 receives a request for an UL grant for the WD 22 to transmit data (Block S138). Network node 16 transmits the UL grant to the WD 22 on master (cj) (Block S140). Network node 16 receives uplink data transmitted on master (cj) by WD 22 according to the UL grant (Block S142). For example, the UL grant may be received using licensed spectrum while the UL transmission from the WD 22 is transmitted using a carrier at the frequency band edge of the unlicensed spectrum.

In one or more embodiments, the UL grant may be transmitted using the at least one carrier in the frequency band edge while the UL from the WD 22 is performed using a licensed carrier at the PCell. In other words, the licensed spectrum may be used in conjunction with the unlicensed spectrum, thereby freeing up licensed spectrum resources by using unlicensed spectrum that existing system simply does not use due to the transmission mask restrictions.

Figure 8:
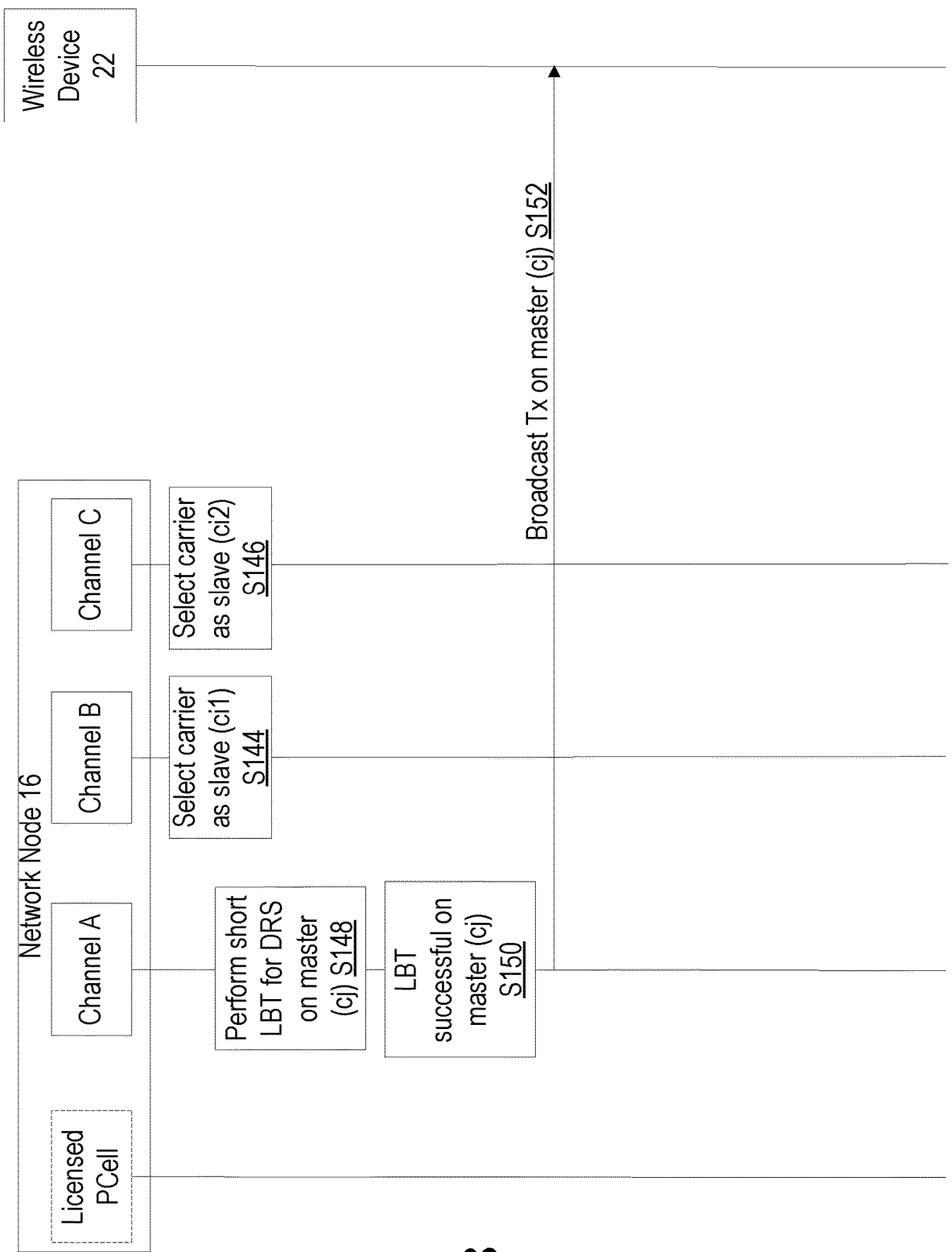
FIG. 8 is a signaling diagram for a beacon only modification in accordance with the principles of the disclosure.

FIG. 8 is a signaling diagram for an example beacon only modification in accordance with the principles of the disclosure. Network node 16 selects a carrier corresponding to channel B as slave (ci1), i.e., as slave carrier (ci1) (Block S144). Network node 16 selects a carrier corresponding to Channel C as slave (ci2), i.e., as slave carrier (ci2) (Block S146). Network node 16 performs short LBT for DRS on master (cj) (Block S148). Network node 16 determines LBT on master (cj) is successful (Block S150). Successful LBT, as used herein, may correspond to a situation where detected transmission power on a carrier such as master (cj) is below a predefined threshold. Network node broadcast a beacon on master (cj), i.e., on LAA SCell that uses master (cj) (Block S152). In one or more embodiments, the WD 22 may perform RSSI and/or RSPR measurements based on the received beacon.

Figure 9:
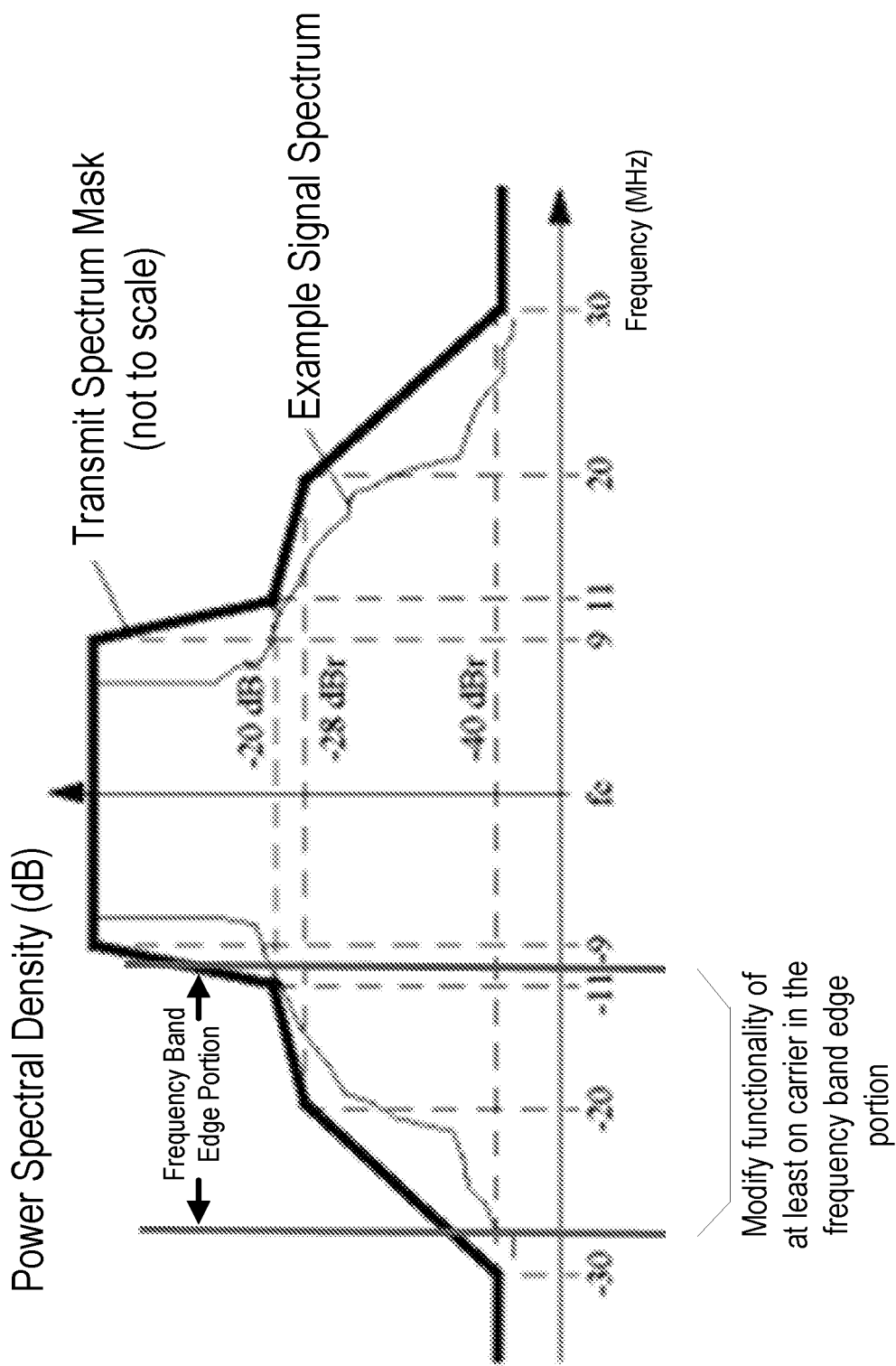
FIG. 9 is a diagram of a transmit spectrum mask indicating a portion of the unlicensed spectrum where functionality performs on one or more carriers has been modified.

FIG. 9 is a diagram of a transmit spectrum mask indicating a portion of the unlicensed spectrum where functionality performed on one or more carriers has been modified as described herein. For example, the portion of the unlicensed spectrum corresponds to a frequency band edge.

As will be appreciated by one of skill in the art, the concepts described herein may be embodied as a method, data processing system, and/or computer program product. Accordingly, the concepts described herein may take the form of an entire hardware embodiment, an entire software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory or storage medium that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may, in fact, be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscate to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node for operating in an unlicensed frequency band, the network node comprising:
processing circuitry configured to:
modify at least one function of at least one carrier in a frequency band edge of the unlicensed frequency band, the frequency band edge being located, in a frequency domain, in a non-transmission portion of a spectrum mask that is configured to reduce leakage into an adjacent frequency band, the at least one carrier having the modified at least one function including a master carrier for performing at least one listen before talk, LBT, function related to determining whether a transmission is present on the at least one carrier before the at least one carrier is used for performing a communication function; and perform a communication function using the at least one carrier having the modified at least one function.

2. The network node of claim 1, wherein the modifying of at least one function of at least one carrier includes disabling scheduling of control and wireless device data on the at least one carrier.

3. The network node of claim 1, wherein the modifying of at least one function of at least one carrier includes:
disabling scheduling of wireless device data on the at least one carrier; and
configuring communication of a beacon on the at least one carrier.

4. The network node of claim 1, wherein the modifying at least one function of at least one carrier includes:
disabling scheduling of downlink control and wireless device data from the network node to the wireless device; and
configuring scheduling of uplink control and wireless device data from the wireless device to the network node.

5. The network node of claim 1, wherein the modifying at least one function of at least one carrier includes:
disabling scheduling of downlink data of a wireless device on the at least one carrier;
configuring communication of a downlink beacon to the wireless device on the at least one carrier; and
configuring scheduling of uplink control and wireless device data from the wireless device to the network node.

6. The network node of claim 1, wherein the frequency band edge of the unlicensed frequency band includes up to a 20 megahertz band, in the frequency domain, in the non-transmission portion of the spectrum mask.

7. The network node of claim 1, wherein the at least one carrier includes a plurality of slave carriers; and
the processing circuitry is further configured to determine whether to perform the at least one LBT function on the plurality of slave carriers based on a result from performing the at least one LBT function on the master carrier.

8. The network node of claim 1, wherein the performing of the communication function using the at least one carrier having the modified at least one function is performed after the at least one LBT function is performed.

9. The network node of claim 1, wherein the processing circuitry is further configured to:
receive an indication from a wireless device indicating that the wireless device is capable of license assisted access, LAA, that augments communications on licensed carriers with communications on unlicensed carriers.

10. The network node of claim 1, wherein the processing circuitry is further configured to:
rank a plurality of carriers operating in the frequency band edge of the unlicensed frequency band based on:
carrier measurements of the frequency band edge of the unlicensed frequency band;
transmit power restrictions on the frequency band edge of the unlicensed frequency band; and
schedule a wireless device on a highest rank carrier of the ranked plurality of carriers, the at least one carrier having the modified at least one function being the highest ranked carrier.

11. The network node of claim 1, wherein an edge portion of the non-transmission portion of the spectrum mask corresponds to an out-of-band emissions, OOBE, regulation of the frequency band edge.

12. A method for a network node for operating in an unlicensed frequency band, the method comprising:
modifying at least one function of at least one carrier in a frequency band edge of the unlicensed frequency band, the frequency band edge being located, in a frequency domain, in a non-transmission portion of a spectrum mask that is configured to reduce leakage into an adjacent frequency band, the at least one carrier having the modified at least one function including a master carrier for performing at least one listen before talk, LBT, function related to determining whether a transmission is present on the at least one carrier before the at least one carrier is used for performing a communication function; and
performing a communication function using the at least one carrier having the modified at least one function.

13. The method of claim 12, wherein the modifying of at least one function of at least one carrier includes disabling scheduling of control and wireless device data on the at least one carrier.

14. The method of claim 12, wherein the modifying of at least one function of at least one carrier includes:
disabling scheduling of wireless device data on the at least one carrier; and
configuring communication of a beacon on the at least one carrier.

15. The method of claim 12, wherein the modifying of at least one function of at least one carrier includes:
disabling scheduling of downlink control and wireless device data from the network node to the wireless device; and
configuring scheduling of uplink control and wireless device data from the wireless device to the network node.

16. The method of claim 12, wherein the modifying of at least one function of at least one carrier includes:
disabling scheduling of downlink data of a wireless device on the at least one carrier;
configuring communication of a downlink beacon to the wireless device on the at least one carrier; and
configuring scheduling of uplink control and wireless device data from the wireless device to the network node.

17. The method of claim 12, wherein the frequency band edge of the unlicensed frequency band includes up to a 20 megahertz band, in the frequency domain, in the non-transmission portion of the spectrum mask.

18. The method of claim 12, wherein the at least one carrier includes a plurality of slave carriers; and
the method further comprising determining whether to perform the at least one LBT function on the plurality of slave carriers based on a result from performing the at least one LBT function on the master carrier.

19. The method of claim 12, wherein the performing of the communication function using the at least one carrier having the modified at least one function is performed after the at least one LBT function is performed.

20. The method of claim 12, further comprising receiving an indication from a wireless device indicating that the wireless device is capable of license assisted access, LAA, that augments communications on licensed carriers with communications on unlicensed carriers.

21. The method of claim 12, further comprising:
ranking a plurality of carriers operating in the frequency band edge of the unlicensed frequency band based on:
carrier measurements of the frequency band edge of the unlicensed frequency band;
transmit power restrictions on the frequency band edge of the unlicensed frequency band; and
scheduling a wireless device on a highest rank carrier of the ranked plurality of carriers, the at least one carrier having the modified at least one function being the highest ranked carrier.

22. The method of claim 12, wherein an edge portion of the non-transmission portion of the spectrum mask corresponds to an out-of-band emissions, OOBE, regulation of the frequency band edge.

23. A wireless device for operating in an unlicensed frequency band, the wireless device comprising:
processing circuitry configured to:
receive an indication that at least one function of at least one carrier in a frequency band edge of the unlicensed frequency band has been modified, the frequency band edge being located, in a frequency domain, in a non-transmission portion of a spectrum mask that is configured to reduce leakage into an adjacent frequency band, the at least one carrier having the modified at least one function including a master carrier for performing at least one listen before talk, LBT, function related to determining whether a transmission is present on the at least one carrier before the at least one carrier is used for performing the communication function; and
perform a communication function using the at least one carrier having the modified at least one function.

24. The wireless device of claim 23, wherein the modifying of at least one function of at least one carrier includes disabling scheduling of control and wireless device data on the at least one carrier.

25. The wireless device of claim 23, wherein the modifying of at least one function of at least one carrier includes:
disabling scheduling of wireless device data on the at least one carrier; and
configuring communication of a beacon on the at least one carrier.

26. The wireless device of claim 23, wherein the modifying of at least one function of at least one carrier includes:
disabling scheduling of downlink control and wireless device data from a network node to the wireless device; and
configuring scheduling of uplink control and wireless device data from the wireless device to the network node.

27. The wireless device of claim 23, wherein the modifying of at least one function of at least one carrier includes:
disabling scheduling of downlink data of a wireless device on the at least one carrier;
configuring communication of a downlink beacon to the wireless device on the at least one carrier; and
configuring scheduling of uplink control and wireless device data from the wireless device to a network node.

28. The wireless device of claim 23, wherein the frequency band edge of the unlicensed frequency band includes up to a 20 megahertz band, in the frequency domain, in the non-transmission portion of the spectrum mask.

29. The wireless device of claim 23, wherein the at least one carrier includes a plurality of slave carriers for performing at least one LBT function based on a result from performing the at least one LBT function on the master carrier.

30. The wireless device of claim 23, wherein the performing of the communication function using the at least one carrier having the modified at least one function is performed after the at least one LBT function has been performed.

31. The wireless device of claim 23, wherein the processing circuitry is further configured to:
provide an indication indicating that the wireless device is capable of license assisted access, LAA, that augments communications on licensed carriers with communications on unlicensed carriers.

32. The wireless device of claim 23, wherein the processing circuitry is further configured to receive a scheduling for a highest rank carrier of a plurality of ranked carriers operating in the frequency band edge of the unlicensed frequency band, the plurality of ranked carriers being ranked based on:
carrier measurements of the frequency band edge of the unlicensed frequency band; and
transmit power restrictions on the frequency band edge of the unlicensed frequency band.

33. The wireless device of claim 23, wherein an edge portion of the non-transmission portion of the spectrum mask corresponds to an out-of-band emissions, OOBE, regulation of the frequency band edge.

34. A method for a wireless device for operating in an unlicensed frequency band, the method comprising:
receiving an indication that at least one function of at least one carrier in a frequency band edge of the unlicensed frequency band has been modified, the frequency band edge being located, in a frequency domain, in a non-transmission portion of a spectrum mask that is configured to reduce leakage into an adjacent frequency band, the at least one carrier having the modified at least one function including a master carrier for performing at least one listen before talk, LBT, function related to determining whether a transmission is present on the at least one carrier before the at least one carrier is used for performing the communication function; and
performing a communication function using the at least one carrier having the modified at least one function.

35. The method of claim 34, wherein the modifying of at least one function of at least one carrier includes disabling scheduling of control and wireless device data on the at least one carrier.

36. The method of claim 34, wherein the modifying of at least one function of at least one carrier includes:
disabling scheduling of wireless device data on the at least one carrier; and
configuring communication of a beacon on the at least one carrier.

37. The method of claim 34, wherein the modifying of at least one function of at least one carrier includes:
disabling scheduling of downlink control and wireless device data from a network node to the wireless device; and
configuring scheduling of uplink control and wireless device data from the wireless device to the network node.

38. The method of claim 34, wherein the modifying of at least one function of at least one carrier includes:

disabling scheduling of downlink data of a wireless device on the at least one carrier;

configuring communication of a downlink beacon to the wireless device on the at least one carrier; and configuring scheduling of uplink control and wireless device data from the wireless device to a network node.

39. The method of claim 34, wherein the frequency band edge of the unlicensed frequency band includes up to a 20 megahertz band, in the frequency domain, in the non-transmission portion of the spectrum mask.

40. The method of claim 34, wherein the at least one carrier includes a plurality of slave carriers for performing at least one LBT function based on a result from performing the at least one LBT function on the master carrier.

41. The method of claim 34, wherein the performing of the communication function using the at least one carrier having the modified at least one function is performed after the at least one LBT function has been performed.

42. The method of claim 34, further comprising providing an indication indicating that the wireless device is capable of license assisted access, LAA, that augments communications on licensed carriers with communications on unlicensed carriers.

43. The method of claim 34, further comprising receiving a scheduling for a highest rank carrier of a plurality of ranked carriers operating in the frequency band edge of the unlicensed frequency band, the plurality of ranked carriers being ranked based on:

carrier measurements of the frequency band edge of the unlicensed frequency band; and transmit power restrictions on the frequency band edge of the unlicensed frequency band.

44. The method of claim 34, wherein an edge portion of the non-transmission portion of the spectrum mask corresponds to an out-of-band emissions, OOBE, regulation of the frequency band edge.

* * * * *